Aug. 18, 1936. E. A. WALCHER 2,051,660
TRUCK
Filed July 16, 1932  4 Sheets-Sheet 2
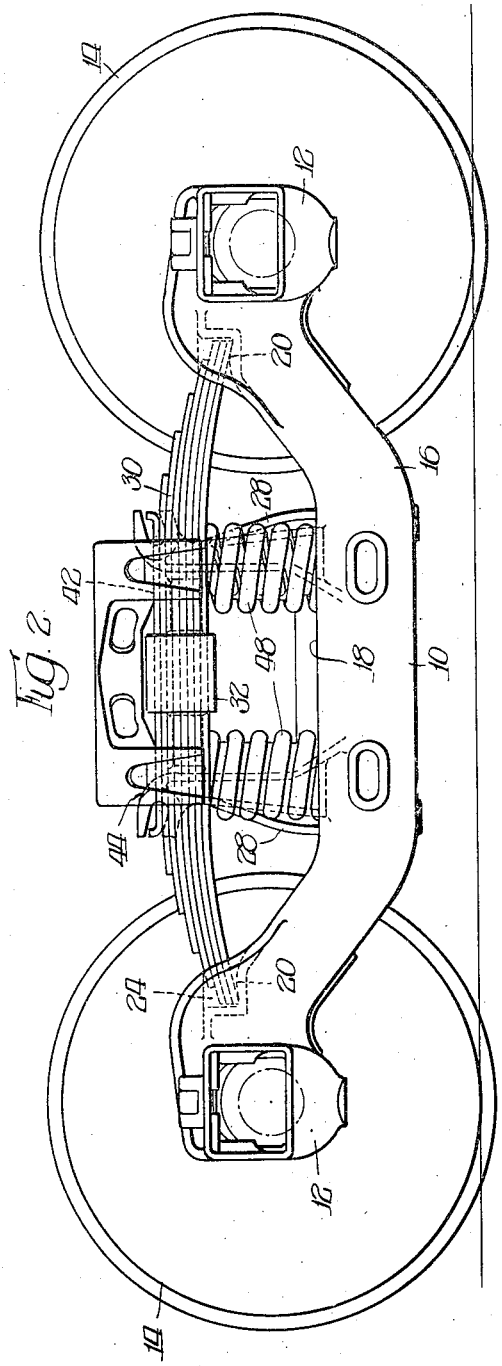
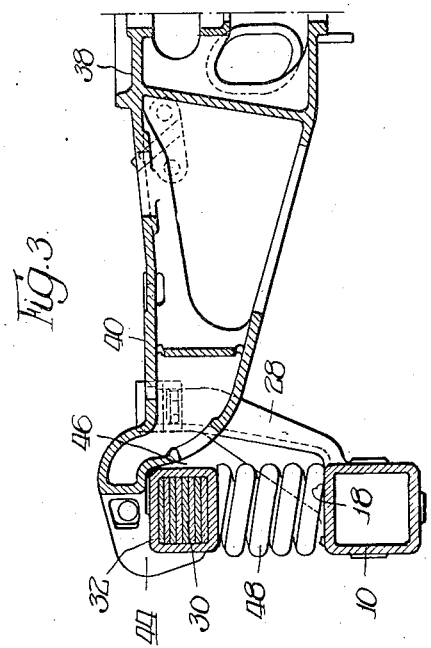
Inventor:
Edwin A. Walcher Aug. 18, 1936.  E. A. WALCHER  2,051,660
TRUCK
Filed July 16, 1932  4 Sheets-Sheet 3
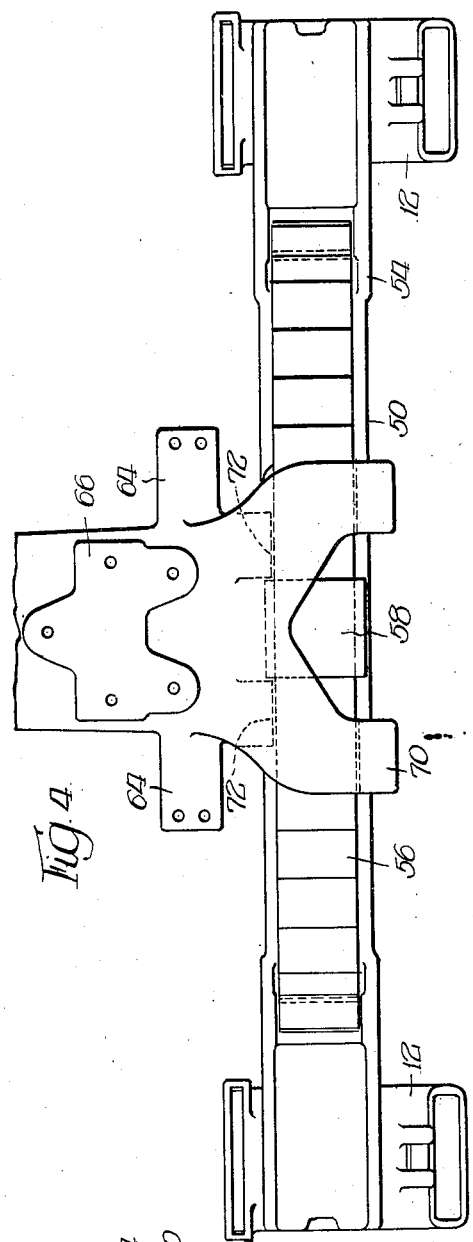
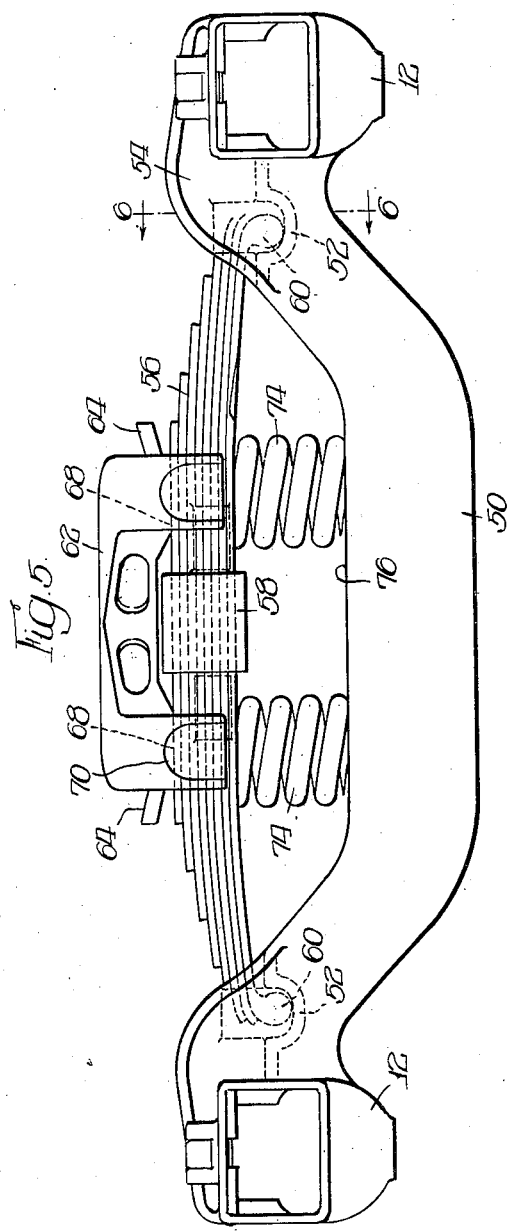
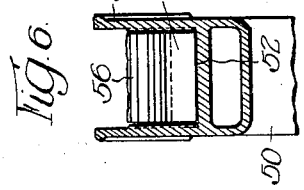
Inventor:
Edwin A. Walcher

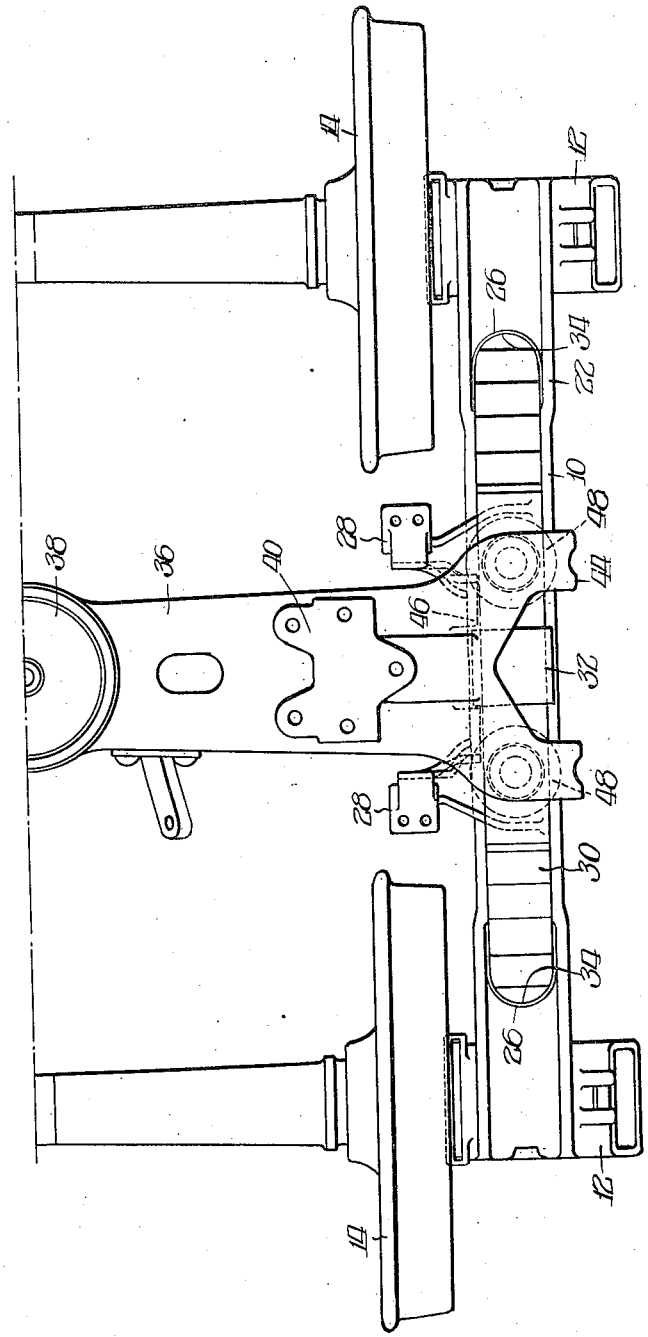

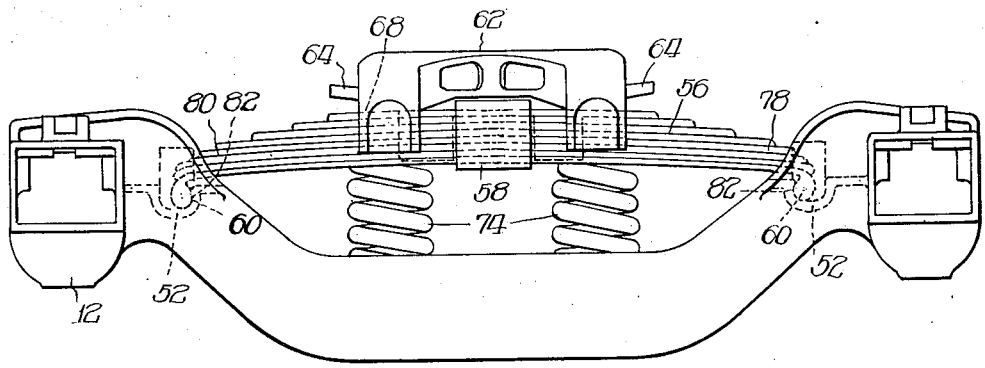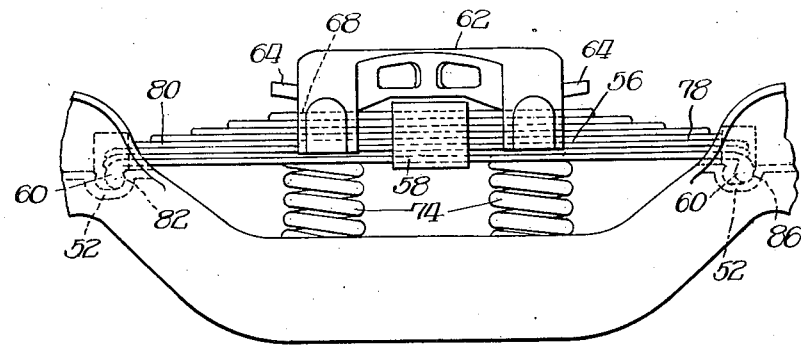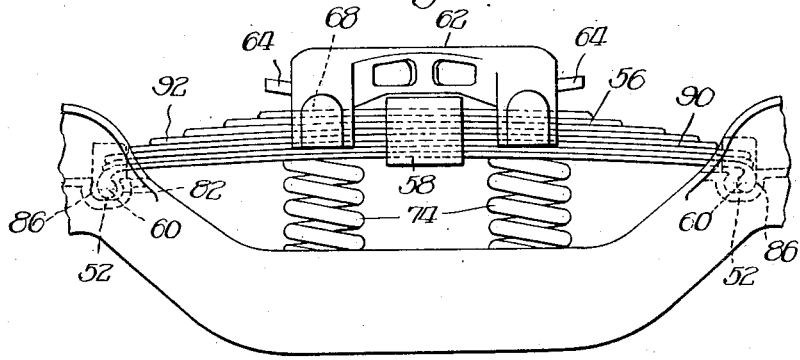

Patented Aug. 18, 1936

2,051,660

UNITED STATES PATENT OFFICE 2,051,660

TRUCK

Edwin A. Walcher, Calumet City, Ill., assignor to American Steel Foundries, Chicago, Ill., a corporation of New Jersey Application July 16, 1932, Serial No. 622,874

33 Claims. (Cl. 105—197.1)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series, the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Yet another object is to provide a truck construction wherein resilient pads are provided for increasing the frictional absorption of certain of the resilient members and/or for dampening out metallic vibrations transmitted through the metallic truck parts, and also for the purpose of deadening noise.

A yet further object is to provide a truck construction wherein the load carrying member is supported on the side frame by resilient members of different characteristics and so arranged that certain of the resilient members support a greater portion of the load than other of the resilient members.

Another additional object is to provide a truck construction wherein resilient supporting means is carried in rounded pockets to avoid spring breakages which are the result of contacts of square corners of the leaves with adjacent rigid supports.

A further additional object is to provide a truck construction wherein the springs are arranged to avoid any end pressure being placed upon them since the thrust which occurs on the springs will be carried by the tension on one end or the other.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a side elevation of the truck construction shown in Figure 1;

Figure 3 is a transverse sectional elevation of the truck construction shown in Figures 1 and 2, the same being taken substantially in the plane of the transverse center line of the truck;

Figure 4 is a fragmentary top plan view of a modified form of truck construction embodying the invention;

Figure 5 is a side elevation of the truck construction shown in Figure 4;

Figure 6 is a transverse fragmentary sectional elevation taken substantially in the plane as indicated by the line 6—6 of Figure 5;

Figure 7 is a side elevation of another modified form of truck construction embodying the invention;

Figure 8 is a side elevation of the truck construction shown in Figure 7, showing the position of the longitudinal spring at maximum effective length thereof;

Figure 9 is a side elevation of still another modified form of truck construction embodying the invention.

Referring first of all more particularly to the truck construction shown in Figures 1, 2 and 3, the truck side frame 10 is provided with the journal boxes 12 adjacent the ends thereof having cooperative relation with the journal ends of wheel and axle assemblies 14. The side frame 10 consists of the single beam member 16 of substantial box section, said beam member 16 being depressed intermediate the journal boxes to provide the spring seat portion 18. The side frame is provided adjacent the journal boxes 12 with the arcuate spring seats 20 disposed between the side flanges 22 wherein a pocket 24 is formed, the end of the pocket being defined by the arcuate or rounded wall 26. The side frame is provided with the brake hanger brackets 28 disposed between the wheel and axle assemblies, it being understood that the brake hanger brackets may be disposed either on the bolster or additional brake hanger brackets may be provided by an extension on the side frame to accommodate clasp brakes, all as shown and described in application Serial No. 593,954, filed February 19, 1932, by Alfred H. Oelkers.

The semi-elliptic leaf spring assembly 30 is provided with the spring band 32 disposed adjacent the center thereof and on the transverse center line of the truck, the ends of the leaf spring assembly being seated on the seats 20 and being complementarily rounded as at 34 to the wall 26. Any load carrying member such as a bolster or transom may be supported on the leaf springs 30. In the case shown, the bolster 36 provided with the center bearing 38 and the side bearings 40 is supported at spaced points on the leaf spring on each side of the spring band as at 42, the bolster being provided with the yoke portion 44 embracing the leaf spring, and also the spaced lugs 46 engaging the spring band 32 for positioning the bolster with respect to the leaf spring.

Spaced coil spring nests 48 are supported on the spring seat portion 18 of the side frame and engage the underside of the leaf spring assembly 30, preferably in vertical alignment with the seats 42 whereby the leaves of the leaf spring assembly are pinched together to increase the frictional absorption thereof.

Referring now more particularly to the construction shown in Figures 4 to 9 inclusive, the side frame 50 is of single box-shaped beam construction, similar to the side frame 10, being provided with the journal boxes 12 for accommodation of the journal ends of the wheel and axle assemblies. In this case the spring seats 52 disposed adjacent the journal boxes 12 are of concave substantially arcuate pocket form, being disposed between the flanges 54 of the side frame.

The semi-elliptic spring assembly 56 is provided with the spring band 58, the ends of the semi-elliptic leaf spring being provided with a substantially cylindrical bearing portion 60 of sufficient depth to support the spring above the pocket 52, the portion 60 being so disposed, in the construction shown in Figures 4 and 5, that initially it is clear of the sides of the pocket to accommodate deflection of the spring 56. The bolster 62 is provided with the brake hanger brackets 64 and suitable center bearing and side bearings 66, and is supported by the seats 68 at spaced points on the leaf spring 56. The yokes 70 are disposed outwardly of the spring and the lugs 72 engage the spring band 58 for positioning the bolster on the leaf spring. The coil springs 74 are interposed between the leaf spring 56 and the seat portion 76 of the side frame 50, the coil springs being arranged in vertical alignment with the seats 68.

In the construction shown in Figure 7, both ends 78 and 80 of the leaf spring assembly 56 are in initial tension, that is, the bearings 60 are initially in substantial contact with the inner concave portion 82 of the pocket 52.

During vertical movement of the load carrying member due to track irregularities, etc., coil springs 74 disposed directly under the seats of the load carrying members, already described, are compressed, with a consequent deflection of the leaf spring assembly 56. During this deflection there is a position of the leaf spring wherein it reaches its maximum elongation, such as shown in Figure 8. When this occurs the leaf spring is proportioned so that the bearing 60 at end 78 is in contact with the outer concave portion 86 of the pocket 52, while the bearing 60 at end 80 of the leaf spring still remains in contact with the inner concave pocket 82 of the other pocket 52. There is then, a condition wherein the bearing of the end 80 remains under tension, while the bearing at end 78 is under compression, though with the arrangement described the compression is not excessive, so that there will be no tendency for breaking of the leaf spring.

In the construction shown in Figure 9, one end 90 is initially under compression through contact of the bearing 60 with the outer concave portions 86 of the pockets 52 whereby the end 90 thereof is initially under compression. The end 92 of the leaf spring is preferably arranged so that the bearing 60 is initially spaced from the inner and outer concave portions 82 and 86 of its pocket 52 whereby that end is not initially stressed, movement consequent to elongation of spring 56 taking place at this end.

With such constructions frequent leaf spring breakages are avoided due to the elimination of contacts at square corners of the leaves with adjacent rigid portions of the side frame. The distance between the two seats on the side frame on which the ends of the leaf spring bear have such a relation to the maximum length of the leaf spring that tension will preferably be placed on one end of the spring and compression on the other end at the same time (see Figure 8). Because of the fact that the distance between any two given points on the side frame is constant, this condition will exist only when the leaf spring is of maximum length. The result is that in actual practice nearly all end thrust will be taken by the spring as a tension member, and little or no compression will ever be placed upon it.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having complementarily disposed arcuate portions adapted to take vertical and longitudinal thrusts.

2. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having transversely arcuate complementarily disposed portions and operating to transfer longitudinal thrust thereby tending to prevent cracking or breaking of said spring, and a coil spring interposed between said side frame and load carrying member whereby the load therefrom is supported to a substantially greater extent by said coil spring than said leaf spring.

3. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having transversely arcuate complementarily disposed portions and operating to transfer longitudinal thrust thereby tending to prevent cracking or breaking of said spring, and a coil spring interposed between said side frame and leaf spring whereby the load therefrom is supported to a substantially greater extent by said coil spring than said leaf spring.

4. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having complementarily disposed arcuate portions in the direction of the length of said springs adapted to take vertical and longitudinal thrusts.

5. In a truck, the combination of a side frame provided with journal boxes having cooperative relation with wheel and axle assemblies, a load carrying member, a spring seat on side frame, a leaf spring supporting said load carrying member on said spring seat, said seat and spring having complementary arcuate portions adapted to take vertical and longitudinal thrusts.

6. In a truck, the combination of a side frame provided with journal boxes having cooperative relation with wheel and axle assemblies, a load carrying member, a spring seat on said side frame, a leaf spring supporting said load carrying member on said spring seat, said seat and spring having complementary arcuate thrust portions and arcuate supporting portions.

7. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having complementarily disposed arcuate portions for accommodating the longitudinal thrust of said springs.

8. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having complementarily disposed arcuate portions for accommodating the longitudinal thrust of said spring, said seats having arcuate supporting portions.

9. In a truck, the combination of a side frame provided with journal boxes having combination relation with wheel and axle assemblies, a load carrying member, concave spring seats adjacent said journal boxes, a longitudinally disposed leaf spring having knurled portions disposed in said seats for supporting said load carrying member on said spring seats and adapted to cooperate with said seats for accommodating longitudinal thrust of said spring.

10. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said knurled portions engaging said seats under condition of no load to dispose the ends of said spring in tension.

11. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said knurled portions and seats being so constructed and arranged as to dispose the ends of said spring under condition of no load in tension and under load to place in longitudinal compression one of the ends of said spring upon engagement thereof with said side frame for transmission of longitudinal thrust therebetween.

12. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, one of said knurled portions engaging said seat so as to dispose the adjacent end of said spring in tension.

13. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said spring and seats being so constructed and arranged that one of the ends only of said spring is in longitudinal compression upon engagement thereof with said side frame for transmission of longitudinal thrust therebetween.

14. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having transversely arcuate complementarily disposed portions and operating to transfer longitudinal thrust thereby tending to prevent cracking or breaking of said spring, and resilient means interposed between said side frame and load carrying member whereby the load therefrom is supported to a substantially greater extent by said coil spring than said leaf spring.

15. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said seats and the ends of said spring having transversely arcuate complementarily disposed portions and operating to transfer longitudinal thrust thereby tending to prevent cracking or breaking of said spring, and a coil spring interposed between said side frame and load carrying member whereby the load therefrom is supported to a substantially greater extent by said coil spring than said leaf spring.

16. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said knurled portions engaging said seats under condition of no load to dispose the ends of said spring in tension, and a coil spring interposed between said side frame and load carrying member whereby the load therefrom is supported to a substantially greater extent by said coil spring than said leaf spring.

17. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said knurled portions engaging said seats under condition of no load to dispose the ends of said spring in tension, said spring and seats being so constructed and arranged that one of the ends only of said spring is in longitudinal compression upon engagement thereof with said side frame for transmission of longitudinal thrust therebetween, and a coil spring interposed between said side frame and load carrying member whereby the load therefrom is supported to a substantially greater extent by said coil spring than said leaf spring.

18. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, one of said knurled portions engaging said seat so as to dispose the adjacent end of said spring in tension, and a coil spring interposed between said side frame and load carrying member whereby the load therefrom is supported to a substantially greater extent by said coil spring than said leaf spring.

19. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said spring and seats being so constructed and arranged that one of the ends only of said spring is in longitudinal compression upon engagement thereof with said side frame for transmission of longitudinal thrust therebetween, and a coil spring interposed between said side frame and load carrying member whereby the load therefrom is supported to a substantially greater extent by said coil spring than said leaf spring.

20. In a truck, the combination of a side frame and wheel and axle assemblies, spaced seats on said side frame adjacent the wheel and axle assemblies, a semi-elliptic leaf spring having seats cooperating with said spaced seats, a load carrying member having seating relation with said leaf spring intermediate the ends thereof, said seats being constructed and arranged so that one of the ends of said spring is put under tension under a predetermined movement of said load carrying member.

21. In a truck, the combination of a side frame and wheel and axle assemblies, spaced seats on said side frame adjacent the wheel and axle assemblies, a leaf spring having seats cooperating with said spaced seats, a load carrying member having seating relation with said leaf spring intermediate the ends thereof, said seats being constructed and arranged so that one of the ends of said spring is put under compression in a longitudinal direction under a predetermined movement of said load carrying member.

22. In a truck, the combination of a side frame and wheel and axle assemblies, spaced seats on said side frame adjacent the wheel and axle assemblies, a semi-elliptic leaf spring having seats cooperating with said spaced seats, a load carrying member having seating relation with said leaf spring intermediate the ends thereof, said seats being constructed and arranged so that one of the ends of said spring is put under tension in a longitudinal direction under a predetermined movement of said load carrying member.

23. In a truck, the combination of a side frame and wheel and axle assemblies, spaced seats on said side frame adjacent the wheel and axle assemblies, a leaf spring having seats cooperating with said spaced seats, a load carrying member having seating relation with said leaf spring intermediate the ends thereof, said seats being constructed and arranged so that one of the ends of said spring is put under compression in a longitudinal direction under a predetermined movement of said load carrying member.

24. In a truck, the combination of a side frame having spaced seats thereon, a leaf spring having seats cooperating with said spaced seats, a load carrying member having seating relation with said leaf spring intermediate the ends thereof, said seats being constructed and arranged so that one of the ends of said spring is put under tension and the other of said ends is put under compression in a longitudinal direction under a predetermined longitudinal movement of said load carrying member relative to said side frame.

25. In a truck, the combination of a side frame and wheel and axle assemblies, spaced seats on said side frame adjacent the wheel and axle assemblies, a semi-elliptic leaf spring having seats cooperating with said spaced seats, a load carrying member having seating relation with said leaf spring intermediate the ends thereof, said seats being constructed and arranged so that the ends of said spring under no load are put under tension and so that under predetermined operation of said truck one of said ends is under compression in a longitudinal direction.

26. In a truck, the combination of a side frame having spaced seats thereon, a leaf spring having seats cooperating with said spaced seats, a load carrying member carried by said leaf spring, said seats being constructed and arranged so that one of the ends of said spring under no load and upon predetermined longitudinal movement of said load carrying member relative to said side frame is under compression and the other end is free of end thrust and so that said relation exists under load and upon said predetermined movement.

27. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having complementarily longitudinally and transversely disposed arcuate portions, and a coil spring interposed between said side frame and load carrying member whereby the load therefrom is supported to a substantially greater extent by said coil spring than said leaf spring.

28. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having complementarily longitudinally and transversely disposed arcuate portions, and a coil spring interposed between said side frame and leaf spring whereby the load therefrom is supported to a substantially greater extent by said coil spring than said leaf spring.

29. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having complementarily longitudinally and transversely disposed arcuate portions for accommodating the end thrust of said springs, and a coil spring interposed between said side frame and load carrying member whereby the load therefrom is supported to a substantially greater extent by said coil spring than said leaf spring.

30. In a truck, the combination of a side frame provided with journal boxes having cooperative relation with wheel and axle assemblies, a load carrying member, spring seats adjacent said journal boxes, a longitudinally disposed leaf spring supporting said load carrying member on said spring seats, said seats and the ends of said spring having transversely arcuate complementarily disposed portions with respect to the plane of said side frame and cooperating to transfer longitudinal thrust without any tendency to crack or break said spring.

31. In a truck, the combination of a side frame provided with journal boxes having cooperative relation with wheel and axle assemblies, a load carrying member, concave spring seats adjacent said journal boxes, a longitudinally disposed leaf spring having knurled portions disposed in said seats for supporting said load carrying member on said spring seats, said seats and the ends of said spring having transversely arcuate complementarily disposed portions with respect to the plane of said side frame and operating to transfer longitudinal thrust thereby tending to prevent cracking or breaking of said spring.

32. In a truck, the combination of a side frame provided with journal means having cooperative relation with wheel and axle assemblies and being provided with spaced depressed spring seats adjacent said journal means, a longitudinally disposed leaf spring having portions disposed in said seats, and a load carrying member having seating relation with said leaf spring intermediate the ends thereof, said spring and said seats being so constructed and arranged that under no load said spring portions engage the inner face of said seats whereby said spring is under longitudinal tension and so that under load upon predetermined longitudinal movement of said load carrying member relative to said side frame one of said spring portions engages the outer face of one of said seats to place that end of the spring under longitudinal compression and the other spring portion maintains its engagement with the inner face of the other of said seats whereby that end of the spring is under longitudinal tension.

33. In a truck, the combination of a side frame provided with journal means having cooperative relation with wheel and axle assemblies and being provided with spaced depressed spring seats adjacent said journal means, a longitudinally disposed leaf spring having portions disposed in said seats, and a load carrying member having seating relation with said leaf spring intermediate the ends thereof, said spring and said seats being so constructed and arranged that under no load and upon predetermined longitudinal movement of said load carrying member relative to said side frame one of said spring portions engages the outer face of one of said seats to place that end of the spring under longitudinal compression and the other end of said spring is free of longitudinal end thrust and so that said relation exists after said load carrying member is loaded and the spring has had said predetermined longitudinal movement with respect to said side frame.

EDWIN A. WALCHER.

CERTIFICATE OF CORRECTION.

Patent No. 2,051,660. August 18,1936.

EDWIN A. WALCHER.

It is hereby certified that error appears in the printed specification of the above numbered patent requiring correction as follows: Page 3, second column, line 15, claim 9, for the word "combination" read cooperative; and that the said Letters Patent should be read with this correction therein that the same may conform to the record of the case in the Patent Office.

Signed and sealed this 13th day of October, A. D. 1936.

Henry Van Arsdale (Seal)  Acting Commissioner of Patents.